Dec. 2, 1941.   G. W. BAUGHMAN   2,264,500
RAILWAY SIGNALING APPARATUS
Filed Aug. 11, 1939

INVENTOR
George W. Baughman.
BY
HIS ATTORNEY

Patented Dec. 2, 1941

2,264,500

UNITED STATES PATENT OFFICE 2,264,500

RAILWAY SIGNALING APPARATUS

George W. Baughman, Edgewood, Pa., assignor to The Union Switch & Signal Company, Swissvale, Pa., a corporation of Pennsylvania Application August 11, 1939, Serial No. 289,639

3 Claims. (Cl. 177—353)

My invention relates to railway signaling apparatus, and has particular reference to the organization of such apparatus into impulse counting relay chains of the class employed in railway signaling systems utilizing coded or periodically interrupted energy.

Relay chains of the above described class are particularly well adapted for, but are in no way limited thereto, use as time measuring devices in railway signaling systems. Particularly, such relay chains are suitable for use in connection with highway crossing signal systems as time measuring devices to determine the speed of trains approaching a railway-highway intersection. In connection with such relay chains, it is desirable to provide means to reduce the number of relays required to form the relay chain, thereby reducing the initial and maintenance costs of such chains.

Acccordingly, an object of my present invention is the organization of novel and improved forms of impulse counting relay chains.

Another object is the organization of novel forms of impulse counting relay chains employing a relatively small number of relays to count a relatively large number of energy impulses.

A further object is the organization of novel forms of impulse counting relay chains in which relays are combined in multiples of three to provide a chain capable of counting $2^n$ impulses, where $n$ is an exponent corresponding to the multiple of three employed in the chain.

An additional object is the organization of novel forms of impulse counting relay chains in which relays are combined in multiples of three, and in which control circuits are selectively controlled in accordance with the number of energy impulses received and counted by the relay chain.

Another object is the provision of novel and improved forms of impulse counting relay chains of the class suitable for use as time measuring devices in railway signaling systems.

A further object is the provision of novel time measuring devices of the class suitable for use in highway crossing signal systems to measure the speed of trains approaching the intersection, and which devices may be controlled jointly with other signaling apparatus by a flasher relay or other suitable current interrupting devices.

Other objects and advantages of my invention will appear from the following description taken in connection with the accompanying drawing.

I shall describe two forms of apparatus embodying my invention, and shall then point out the novel features thereof in claims.

Figure 1:
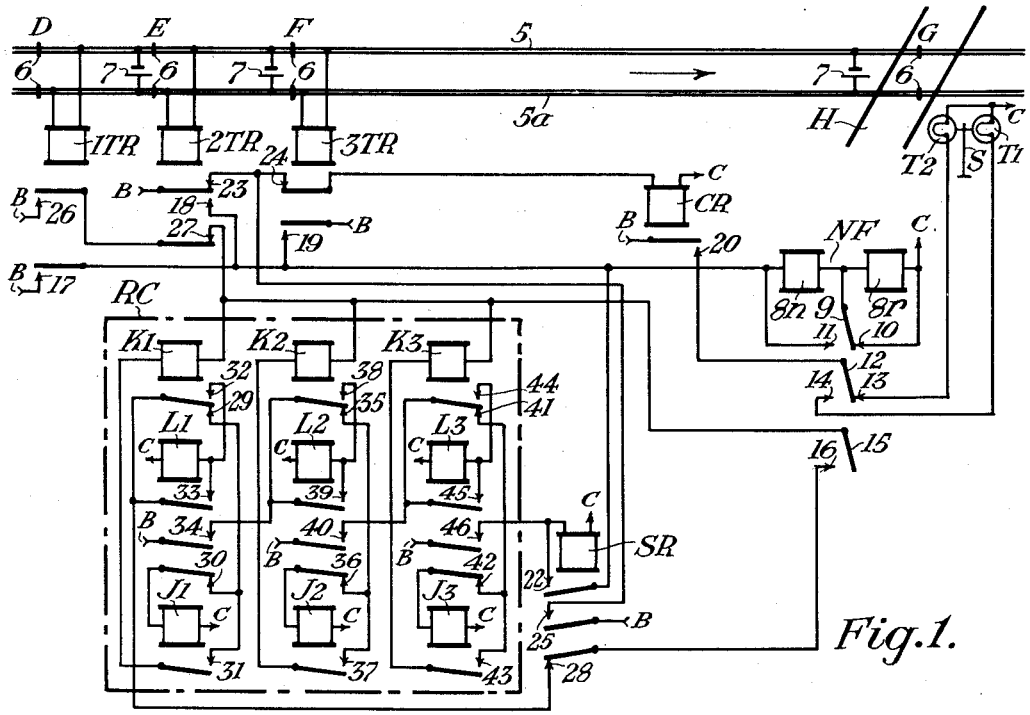
Figure 2:
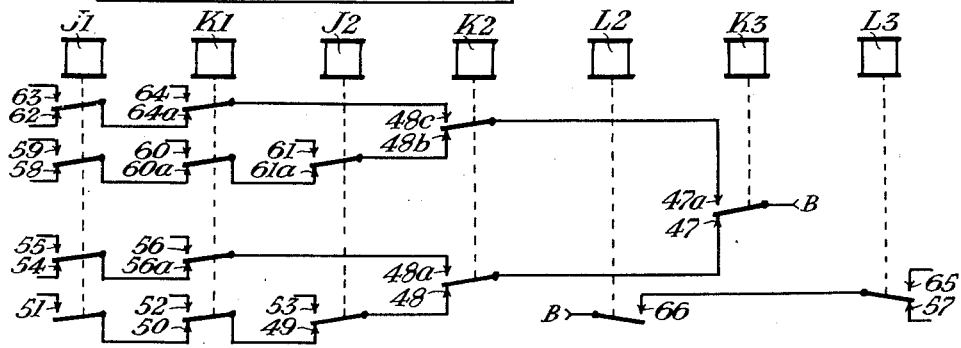
Figure 3:
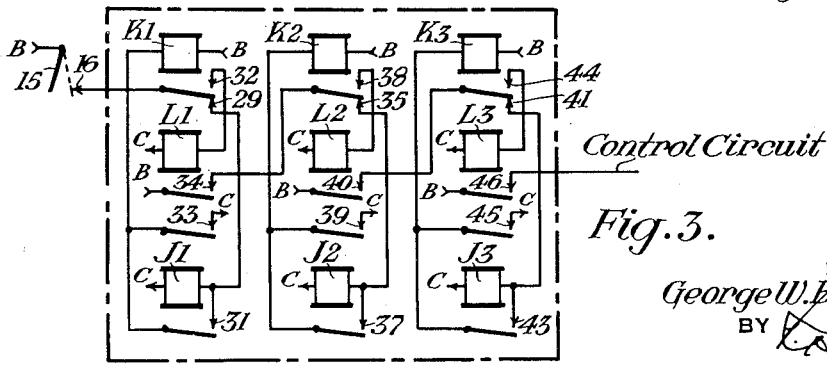

In the accompanying drawing, Fig. 1 is a diagrammatic view in which a preferred form of apparatus embodying my invention is shown employed as a time measuring device incorporated in a highway crossing signal system. Fig. 2 is a diagrammatic view showing a network of control circuits which may be incorporated into the apparatus shown in Fig. 1, and which also embodies my invention. Fig. 3 is a diagrammatic view of a modified form of the apparatus shown in Fig. 1, and which also embodies my invention.

Similar reference characters refer to similar parts in each of the several views.

Referring first to Fig. 1, the reference characters 5 and 5a designate the track rails of a stretch of railway track over which traffic normally moves in the single direction indicated by an arrow in the drawing, and which I shall assume to be the eastbound direction. The rails 5 and 5a are divided by means of the usual insulated rail joints 6 into successive adjoining sections D—E, E—F and F—G, which are provided with track circuits comprising in each instance a suitable source of current, such as a track battery 7, connected across the track rails at one end of the section, and the winding of a track relay, designated by the reference characters ITR, 2TR or 3TR, as the case may be, connected across the track rails at the other end. Section D—E I shall term a measuring section; section E—F I shall term a first operating section; and section F—G I shall term a positive operating section. Section F—G is intersected at grade adjacent its exit end G by a highway H, and has located at such intersection a highway crossing signal S. Signal S, as shown, preferably is of the flashing light type, and comprises two signal lamps T1 and T2 which are adapted to be alternately flashed at a rate of substantially 30 times per minute to simulate the appearance of a horizontally swinging red lantern. It is to be understood, of course, that while only one signal S is shown in the drawing for the sake of simplicity, in actual practice a second signal similar to signal S will be located at the intersection on the other side of the track to warn highway users approaching the intersection from that side of an approaching train.

The reference character CR designates a control relay for controlling the operation of signal S, and which relay normally is energized over a circuit which extends from one terminal B of a suitable source of current, such as a battery, not shown, through front contact 23 of relay 2TR, front contact 24 of relay 3TR, and the winding of relay CR to the other terminal C of the source of current. Relay CR is, therefore, normally responsive to traffic conditions in both sections E—F and F—G, and, as will be pointed out hereinafter, normally is effective to initiate operation of signal S when a train enters operating section E—F. Relay CR is, however, provided with an alternate energizing circuit which may be traced from terminal B through front contact 25 of a relay SR, later to be referred to, front contact 24 of relay 3TR and the winding of relay CR to terminal C. It is apparent that the alternate energizing circuit of relay CR, when completed, removes that relay from control by relay 2TR, so that the initiation of operation of signal S by a train is prevented until the train enters positive operating section F—G. Relay SR is controlled in a manner to be made clear presently, to cause the operation of signal S to be delayed until section F—G is entered by a train when such train is operating at a speed not exceeding a certain prescribed speed, but is ineffective to delay the operation of the signal when the train operates at a speed above the prescribed speed. Under the latter conditions, operation of signal S is initiated when the train enters section E—F, and is continued until the train vacates section F—G. The two sections E—F and F—G, therefore, comprise the operating section for trains operating above the prescribed speed.

In order better to describe the operation of the apparatus embodying my invention, I shall assume that it is desired to operate signal S for a minimum operating period of 20 seconds prior to a train arriving at the intersection when the train is operating at the above-mentioned prescribed speed, operation of the signal being initiated, as stated above, when the train enters section F—G. I shall also assume that for the purpose of illustration, the prescribed speed is 45 miles per hour or 66 feet per second. Under the assumed conditions, therefore, section F—G is substantially 1320 feet in length, since a train traveling at 66 feet per second will advance 1320 feet in 20 seconds.

I shall further assume that the maximum speed of trains operating over the stretch is 90 miles per hour or 132 feet per second, and that it is desired to operate the signal for a minimum operating period of 20 seconds prior to a train operating at the maximum speed arriving at the intersection, operation of the signal being initiated, as was pointed out heretofore, when the train enters section E—F and the operation being continued until the train vacates section F—G. Under the above assumed conditions, therefore, sections E—F and F—G, taken together, extend from the highway substantially 2640 feet, since a train operating 132 feet per second travels approximately 2640 feet in 20 seconds. Hence, with section F—G assumed to be 1320 feet in length, it is readily apparent that section E—F also is 1320 feet in length.

Section D—E extends in the direction of approaching traffic from the entrance end E of section E—F a distance sufficient to provide a suitable measuring section for measuring the speed of trains approaching the intersection. Specifically, the section D—E is adapted to control time measuring apparatus, hereinafter referred to, which controls relay SR to delay the initiation of the operation of the signal S until the train enters section F—G, if the train is operating at a speed below the heretofore mentioned prescribed speed of 45 miles per hour. The length of section D—E may be varied to suit best the particular arrangement of time measuring apparatus and conditions of prescribed speed, and the length suitable for use in the particular example chosen to serve as an illustration of my invention will be assumed to be approximately 990 feet.

The reference character NF designates contact operating means having circuit controlling contacts which are periodically opened and closed, and which contacts are employed at times in a manner to be explained presently, to flash the lamps of the highway crossing signal. As shown, the contact operating means NF comprises a flasher relay, but it is contemplated that other types of contact operating devices may be employed, the characteristic and controlling feature of such devices being the fact that circuit controlling contacts are recurrently opened and closed for uniform periods of time. For example, a code transmitter of the class utilized to code the supply of trackway energy in coded track circuit signaling systems might be employed, and, in connection with such coded signaling systems, might be utilized not only to code the supply of trackway energy and flash the lamps of the highway crossing signal, but also to supply current or energy impulses to time measuring apparatus later to be referred to.

Relay NF may take any one of several well-known forms, but a preferred form is that disclosed in United States Patent No. 2,144,543 issued January 17, 1939 to Benjamin Mishelevich, for Electrical relays, and which relay comprises in its essential elements two windings $8n$ and $8r$ adapted to operate pivoted contact members 9, 12 and 15. The contact members 9, 12 and 15 are biased to normal position, that is, the position shown in Fig. 1, wherein contact member 9 engages normal contact 10, contact 12 engages normal contact 13, and contact member 15 is open. When contact members 9, 12 and 15 are operated in a manner described hereinafter, in a clockwise direction to a reverse position, the contact members 9, 12 and 15 engage reverse contacts 11, 14 and 16, respectively. Contact member 9 when in engagement with normal contact 10 shunts winding $8r$ and when in engagement with reverse contact 11 shunts winding $8n$. Thus, with contact member 9 in its normal position, when an energizing electromotive force is applied across the windings $8n$ and $8r$, winding $8n$ is energized to attract contact members 9, 12 and 15 to operate those contact members in a clockwise direction so that normal contacts 9—10 and 12—13 are opened, and reverse contacts 9—11, 12—14 and 15—16 are closed. This movement of contact member 9 removes the shunt on winding $8r$ and closes the shunt on winding $8n$ so that winding $8n$ is deenergized and winding $8r$ is energized to attract contact members 9, 12 and 15 into their normal positions, thereby opening the reverse contacts and closing the normal contacts of the relay. This cycle of operation is periodically repeated as long as the circuit for relay NF is closed, the relay being so proportioned that an operating cycle is completed substantially every two seconds or 30 times per minute. Relay NF is provided with an energizing circuit which may be traced from terminal B through back contact 17 of relay 1TR or back contact 18 of relay 2TR or back contact 19 of relay 3TR, and the windings $8n$ and $8r$ of relay NF to the other terminal C. It is readily apparent, therefore, that relay NF operates whenever a train occupies the insulated zone adjacent the intersection defined by the insulated joints located at D and G.

The immediate operating circuit for signal S passes from terminal B through back contact 20 of relay CR, then through two alternate paths to terminal C, one path of which comprises normal contact 12—13 of relay NF and the filament of lamp T2 of signal S, and the other path of which comprises reverse contact 12—14 of relay NF and the filament of lamp T1 of signal S. It is to be seen, therefore, that each lamp T1 and T2 is alternately illuminated for 1 second intervals according as normal contact 12—13 or reverse contact 12—14 of relay NF is closed; and that contact 15—16 of relay NF is alternately opened and closed for substantially 1 second intervals each. Hence, time can be measured by counting the number of intervals contact 15—16 is closed or by counting the number of current impulses flowing in a circuit controlled by contact 15—16.

The reference character RC designates time measuring apparatus of the type adapted to count the number of control current impulses supplied thereto. As shown in Fig. 1, the time measuring apparatus comprises a novel form of impulse counting relay chain, the relays of the chain being combined in multiples (here shown as 3) of normally deenergized relays arranged in consecutive groups or rows of three relays each. Each row of relays comprises a first relay, designated by the reference character J plus a suffix corresponding to its associated relay row, each row being designated according to its position in order from left to right as viewed in the drawing by the reference characters 1, 2 and 3, respectively; a second relay designated by the reference character K plus a suffix corresponding to its associated relay row; and a control relay, designated by the reference character L plus a suffix corresponding to its associated relay row. The relays J, K and L of each relay row are interconnected in such manner that when the relay chain is supplied with successive control current impulses, the control relay of each row is picked up for each second successive current impulse supplied to that row. For example, when a first current impulse is received by row 1 of the relay chain, relay J1 becomes energized and picks up, and during the "off" or no-energy period following the first current impulse, relay K1 picks up in series with relay J1. Then, when a second current impulse is supplied to row 1 of the relay chain, control relay L1 picks up. The picking up of relay L1 completes a circuit to be pointed out presently, whereby there is supplied a current impulse to the relay row of the next highest order. The picking up of relay L1 also releases relays J1 and K1. Then, during the "off" or no-energy period following the second current impulse, relay L1 releases to interrupt the circuit supplying the current impulse to row 2 of the chain, with the result that row 1 of the relay chain completes a cycle of energization for each two successive current impulses received by that row of relays. Similarly, control relay L2 for the second row of relays, row 2, also picks up on the second current impulse supplied to row 2 of the relays, and relay L2 on picking up completes a circuit for transmitting a current impulse to the relay row of the next highest order. It is readily apparent that, since relay L1 picks up for each two successive current impulses received by row 1 of the relay chain, and on picking up transmits one current impulse to the row of relays of the next highest order, whereupon control relay L2 picks up for each two successive current impulses received by row 2 of the relay chain to transmit a current impulse to the next row 3 of the relay chain, for a plurality of $n$ rows of relays, the control relay for the $n$th row will pick up once for each 2 raised to the $n$th power ($2^n$) impulses supplied to the relay chain, $n$ in this case being the number of the relay row. Relay chain RC, as will be made clear presently, is supplied with current impulses in response to contact operating means NF periodically opening and closing its contacts, during the interval that a train occupies measuring section D—E and prior to the train entering the operating section E—F.

The reference character SR designates a normally deenergized stick relay, hereinbefore mentioned, which is provided with a pick-up circuit here shown controlled by a front contact of the control relay of the last row of relays of the time measuring means or relay chain RC, (as shown, the pick-up circuit of relay SR is controlled by front contact 46 of control relay L3 of the relay chain) and with a stick circuit which may be traced from terminal B through back contact 17 of relay 1TR or back contact 18 of relay 2TR or back contact 19 of relay 3TR, front contact 22 of relay SR, and the winding of relay SR to terminal C. It is to be seen, therefore, that relay SR is picked up whenever the control relay of the last row of relays of the relay chain is picked up, or in other words, whenever relay chain RC is supplied with $2^n$ current impulses (where $n$ is the number of relay rows). It is also apparent that when relay SR is once picked up, it is held up over its stick circuit as long as a train occupies section D—E, E—F or F—G.

The apparatus of Fig. 1 is in its normal condition, as shown in Fig. 1, when no trains are operating over the stretch of railway track intermediate points D and G. In this normal condition of the apparatus, relays 1TR, 2TR, 3TR and CR are energized, while relays NF, SR, and all of the relays of the relay chain RC are deenergized. Signal S also is deenergized.

In describing the operation of the apparatus embodying my invention, I shall first assume that an eastbound train approaches the intersection at a speed below the prescribed speed of 45 miles per hour. Assuming, for example, that a train operating at 40 miles per hour, or approximately 59 feet per second, enters section D—E, relay 1TR is shunted and releases to close back contact 17 which completes the previously traced energizing circuit for relay NF with the result that relay NF is set into operation. Relay 1TR also closes its back contact 26, which completes a circuit whereby relay chain RC is supplied with current impulses by the recurrent opening and closing of circuit controlling contact 15—16 of the contact operating device, relay NF. This circuit may be traced from terminal B through back contact 26 of relay 1TR, front contact 27 of relay 2TR, contact 15—16 of relay NF, back contact 28 of relay SR, and through the relay chain RC to terminal C in a manner about to be described. The alternate opening and closing of contact 15—16 of relay NF interposed in the above circuit operates to supply time spaced current impulses to the relay chain. As was pointed out hereinbefore, relay NF is arranged to alternately open and close contact 15—16 at a rate of substantially 30 times per minute, so that the "on" period of each current impulse supplied to the relay chain RC is of the order of 1 second in duration, and the "off" or no-energy period following each current impulse likewise is of the order of 1 second in duration.

The eastbound train, operating at 40 miles per hour or 59 feet per second, will require approximately 16 seconds to traverse section D—E, and during this time interval, relay NF operates through approximately 8 cycles of opening and closing its contact 15—16 with the result that 8 current impulses are supplied to relay chain RC through its previously traced circuit. The first current impulse supplied to relay chain RC causes the first relay J1 of the first row of relays to pick up over a circuit which extends from terminal B through back contact 26 of relay 1TR, front contact 27 of relay 2TR, contact 15—16 of relay NF, back contact 28 of relay SR, back contact 29 of relay K1, back contact 30 of relay L1, and the winding of relay J1 to terminal C. Relay J1 in picking up closes its front contact 31, thereby preparing a circuit for the second relay K1 of that row. During the spaced interval resulting from contact 15—16 of relay NF opening, relay K1 picks up in series with relay J1 over a circuit passing from terminal B through back contact 26 of relay 1TR, front contact 27 of relay 2TR, the winding of relay K1, front contact 31 of relay J1, back contact 30 of relay L1, and the winding of relay J1 to terminal C. It should be noted that when relay J1 picks up to close its front contact 31 during the "on" period of the first current impulse, relay K1 does not pick up at that time since that relay is shunted by the circuit path including contact 15—16 of relay NF, back contact 28 of relay SR and back contact 29 of relay K1. Relays J1 and K1 are held energized over their last traced circuit until contact 15—16 of relay NF again closes to transmit a second successive current impulse to row 1 of the relay chain, whereupon control relay L1 of row 1 picks up over a circuit passing from terminal B through back contact 26 of relay 1TR, front contact 27 of relay 2TR, contact 15—16 of relay NF, back contact 28 of relay SR, front contact 32 of relay K1 and the winding of relay L1 to terminal C. Relay L1 on picking up closes its own front contact 33 to complete a holding circuit which shunts front contact 32 of relay K1 and holds relay L1 energized during the "on" period of the second impulse, since relays J1 and K1 are both released when relay L1 picks up due to the opening of back contact 30 of relay L1, interposed in the last traced circuit for those relays. It should be pointed out that relay K1 is preferably provided with slightly slow releasing characteristics, so that relay L1 is picked up to close its front contact 33 and complete its holding circuit prior to front contact 32 of relay K1 opening. Then, during the spaced interval following the second successive current impulse supplied to the relay chain, relay L1 releases.

It should, however, be pointed out that the picking up of relay L1 completes a circuit including the source of current and front contact 34 of relay L1, whereby the second row 2 of the relay chain is provided with a current impulse. During the interval that row 2 of the chain is supplied with the first of two successive current impulses, relay J2 picks up over a circuit including the source of current, front contact 34 of relay L1, back contact 35 of relay K2, back contact 36 of relay L2 and the winding of relay J2. Relay J2 in picking up closes its front contact 37 to prepare a circuit for relay K2. When relay L1 releases during the spaced interval following the second of the two successive impulses supplied to the first row of relays, relay K2 then picks up and relays J2 and K2 are held up over an obvious circuit including back contact 26 of relay 1TR, front contact 27 of relay 2TR, the winding of relay K2, front contact 37 of relay J2, back contact 36 of relay L2 and the winding of relay J2. Then, when relay L1 again is picked up during the second cycle of operation of the first row of relays or on the fourth consecutive impulse received by the relay chain, a current impulse is supplied to the second row of relays and control relay L2 picks up over a circuit which may be traced from terminal B through front contact 34 of relay L1, front contact 38 of relay K2, and the winding of relay L2 to terminal C. Relay L2 in picking up closes its own front contact 39 to complete a holding circuit which shunts front contact 38 of relay K2, so that when relays K2 and J2 release upon back contact 36 of relay L2 being opened, the holding circuit holds relay L2 energized during the interval that current is supplied over front contact 34 of relay L1 to the second row of relays. Relay L2 in picking up also closes its own front contact 40 which operates to supply a current impulse to the third row of relays.

Since the control circuits for the first and second and control relays of each row of relays (except the first row of relays) of the relay chain are similar to the circuits just traced for the second row of relays, it is deemed sufficient to list in the following table the sequence in which the relays of each row of relays pick up upon relay chain RC being supplied with current impulses. In the following table, odd numbers denote the "on" period of successive current impulses, the following even numbers denoting the "off" or spaced intervals following such current impulses:

| Current impulse | Relays energized |
| --- | --- |
| 1 | J1. |
| 2 | J1, K1. |
| 3 | L1, J2. |
| 4 | J2, K2. |
| 5 | J1, J2, K2. |
| 6 | J1, K1, J2, K2. |
| 7 | L1, L2, J3. |
| 8 | J3, K3. |
| 9 | J1, J3, K3. |
| 10 | J1, K1, J3, K3. |
| 11 | L1, J2, J3, K3. |
| 12 | J2, K2, J3, K3. |
| 13 | J1, J2, K2, J3, K3. |
| 14 | J1, K1, J2, K2, J3, K3. |
| 15 | L1, L2, L3. |

Referring to the above table, it is to be noted that control relay L1, for the first row of relays, picks up on each alternate current impulse received by that row of relays, and that the first row of relays completes its cycle of energization at the termination of the spaced interval following the second current impulse received by that row. The control relay L2 of the second row of relays picks up for each two successive current impulses received by that row of relays (the second row receiving one current impulse whenever control relay L1 is picked up), and that row 2 of the relay chain completes its cycle of energization at the end of the spaced interval following each two successive current impulses received by that row. It should further be noted that relay L3 (the control relay for the last row of relays shown in the relay chain RC in Fig. 1) picks up on the eighth current impulse transmitted by contact 15—16 of relay NF to the relay chain, or assuming each current impulse and each spaced interval to be one second, some 15 seconds after the train enters section D—E. It is to be seen, therefore, that relay L3 picks up prior to the train entering section E—F when the train requires more than 15 seconds to traverse section D—E. It follows, therefore, that relay L3 picks up prior to the train operating at 40 miles an hour, or below the prescribed speed of 45 miles per hour, entering section E—F, since such trains require approximately 16 or more seconds to traverse section D—E before entering section E—F. At this time, it should be pointed out that once relay L3 is picked up to complete the pick-up circuit for relay SR, relay SR on picking up opens its back contact 28 interposed in the circuit which supplies current impulses to the relay chain RC in response to the operation of flasher relay NF. It follows that although flasher relay NF continues to operate as long as the train occupies any one of the sections D—E, E—F or F—G, further operation of the relay chain is not effected by the operation of the flasher relay once relay SR is picked up.

It is readily apparent from the foregoing that relay L3 in picking up completes the pick-up circuit for relay SR, with the result that relay SR picks up to close its front contact 22 and thereby complete its stick circuit over back contact 18 of relay 2TR. Relay SR also closes its front contact 25 which completes the alternate energizing circuit of control relay CR and as a result relay 2TR is removed from control of relay CR and the operation of the signal is delayed until the train subsequently enters section F—G and relay 3TR is released. Operation of signal S for the train operating at a speed less than the prescribed speed of 45 miles per hour is, therefore, delayed by means of relay chain RC until such time as the train enters section F—G to release relay 3TR. When this happens, front contact 24 of relay 3TR interposed in the control circuit for relay CR is opened, whereupon relay CR is released and closes back contact 20 to complete the operating circuit for signal S, the lamps of signal S being alternately flashed by the operation of relay NF alternately opening and closing contacts 12—13 and 12—14 interposed in the operating circuit for signal S.

When the train vacates section F—G, relay 3TR picks up to complete at its front contact 24 the control circuit for relay CR, with the result that relay CR picks up to terminate the operation of signal S. Back contact 19 of relay 3TR also is opened, whereupon relays NF and SR become deenergized with the result that the apparatus of Fig. 1 is restored to its normal condition.

It should be noted that the stick circuit of relay SR is controlled over back contacts of relays 1TR, 2TR and 3TR. This arrangement insures that if a train enters and occupies section D—E for a period of time sufficient to cause relay SR to be picked up by the relay chain RC, in the event that such train reverses its direction and recedes from the intersection to vacate section D—E, relay SR then will be released and the apparatus conditioned to measure the speed of the next train entering section D—E.

I shall now assume that, with the apparatus of Fig. 1 in its normal condition, an eastbound train approaching the intersection operating at a speed of 50 miles per hour, that is, the train is operating at a speed above the prescribed speed of 45 miles per hour. In this latter event the entrance of the train on section D—E releases relay 1TR, so that relay NF is set into operation and relay chain RC is supplied with current impulses in the manner set forth in detail hereinbefore. Since a train operating at 50 miles per hour, or approximately 73 feet per second, will traverse section D—E in approximately 13½ seconds, the relay chain RC will consequently be provided with approximately 7 current impulses each separated by a spaced interval, prior to the train entering section E—F. Referring to the table hereinbefore given, it is readily apparent that relay L3, or the control relay for the last row of relays, is not picked up until the 8th current impulse is supplied to the relay chain, so that the train will enter section E—F to release relay 2TR, thereby opening at front contact 27 the circuit whereby relay NF causes current impulses to be supplied to the relay chain RC, prior to relay L3 picking up to complete the previously traced pick-up circuit for relay SR. Relay 2TR released opens at its front contact 23 the previously traced circuit for relay CR, with the result that operation of signal S is initiated when the train, operating at a speed in excess of the prescribed speed of 45 miles per hour, enters section E—F.

The operation of the signal will continue until the train vacates section F—G, operation of the signal while the train occupies section F—G being maintained since front contact 24 of relay 3TR interposed in the circuit for relay CR is open.

From the foregoing description of the operation of the apparatus of Fig. 1, it is readily apparent that I have provided a novel form of impulse counting relay chain in which a relatively small number of relays are organized in such manner that a relatively large number of impulses can be counted, thereby not only reducing the number of working elements of the chain but also reducing the initial and maintenance costs of such chains.

It is to be understood, of course, that while specific values have been assumed for the number of relays of the relay chain in Fig. 1, and also specific values have been assumed for the particular conditions of prescribed train speeds and lengths of track sections of the system shown in Fig. 1, such values are merely illustrative and the apparatus of Fig. 1 may be arranged and proportioned, within limits of course, to meet the varying conditions of prescribed speed, track section lengths, and time intervals required to be measured, for each specific installation at which such apparatus is employed.

In Fig. 1, the relay chain RC is shown arranged to establish a control circuit at the end of a fixed time interval determined by the number of impulses required to be supplied to the relay chain to energize the control relay (L) of the last row ($n$) of relays of the relay chain. As was pointed out heretofore, the number of impulses required to energize the control relay of the $n$th row of relays is determined by the quantity 2 to the $n$th power ($2^n$), so that if three rows of relays (9 relays in all) are employed, eight impulses ($2^3$) are required. Accordingly, it is apparent that if four rows of relays (12 relays in all) are employed, 16 impulses ($2^4$) then will be required to energize the control relay of the last row, and if five rows of relays are employed, 32 impulses ($2^5$) will then be required. It is to be seen, therefore, that the number of impulses required to condition the relay chain RC to establish its control circuit is a function of the quantity 2.

In Fig. 2 is shown a network of control circuits which may be incorporated into the relay chain RC of Fig. 1 to provide a plurality of control circuits selectively controlled by the relays of the chain in accordance with the particular combinations of relays energized in response to the different number of impulses supplied to and received by the relay chain. In order to simplify the drawing and avoid unnecessary duplication of like parts, the control circuits controlling the various relays shown in Fig. 2 are omitted from the drawing, it being understood that the relays there shown may be controlled by circuits similar to those shown and described in connection with relay chain RC of Fig. 1.

Referring now to Fig. 2 and to the table hereinbefore set out for the sequence in which the relays of relay chain RC of Fig. 1 are picked up, it is readily apparent that for each current impulse and each space interval following such impulses, a different one of a plurality of control circuits may be selectively completed in accordance with the particular combination of relays energized. From the table previously set out, it can be seen that relay J1 first becomes energized, and referring to Fig. 2 it is apparent that under the above conditions, a first control circuit, which extends from back contact 47 of relay K3, back contact 48 of relay K2, back contact 49 of relay J2, back contact 50 of relay K1 through front contact 51 of relay J1, then is completed.

When relay K1 picks up on the space interval following the first current impulse, the first control circuit just mentioned is then interrupted, and a second control circuit is completed at front contact 52 of relay K1.

The various control contacts through which the control circuits are selectively completed have been designated in Fig. 2 so that, starting with contact 51 and ending with contact 65, each of the contacts 51 through 65 successively completes a distinctive control circuit, each of the circuits being completed in the sequence corresponding to the sequence in which the different combinations of energized relays are set out in the table of energization of the relays of relay chain RC of Fig. 1.

From the foregoing, it is apparent that when a network of control circuits such as is illustrated in Fig. 2 is combined with the relay chain RC of Fig. 1, a total of at least 15 distinctive control circuits may be selectively controlled in accordance with the number of current impulses (and the accompanying space intervals following such impulses) supplied to the relay chain. It follows, therefore, that an impulse counting relay chain may be constructed in a standard manner, and by proper selection of the control contact through which the control circuit is to be completed, the particular time interval or number of impulses sought to be measured may readily be obtained.

An advantage of the above described apparatus is the provision in an impulse counting relay chain of standard construction, of means whereby the relays may be utilized to selectively complete distinctive control circuits in accordance with the period of time the relay chain is supplied with impulses. Thus, in the event that the relay chain is desired to count, for example, six impulses, the control contact which completes its control circuit only when the relay chain has been supplied with six impulses then would be utilized. However, in the event that conditions change or the relay chain is employed in a manner such that another number of impulses is to be counted, the proper control contact corresponding to the new number of impulses to be counted then may be utilized. Also, when such relay chains are utilized as time measuring apparatus, for example in connection with highway crossing signal systems, the relay chains may be constructed in standard unitary structures and provide the distinctively different time intervals required by the varying conditions of prescribed speed and length of track sections encountered in the different installations.

Referring now to Fig. 3, a modification of the relay chain RC, illustrated in Fig. 1, is shown. In the modification shown in Fig. 3, the contact 15—16, which may be the contact shown in Fig. 1 governed by the contact operating device NF, is adapted to be alternately opened and closed. When contact 15—16 is first closed, relay J1 picks up over a circuit passing from terminal B through contact 15—16, back contact 29 of relay K1 and the winding of relay J1 to terminal C. Relay J1 in picking up closes its own front contact 31, with the result that when contact 15—16 is opened, relay K1 picks up in series with relay J1, over a circuit passing from terminal B through the winding of relay K1, front contact 31 of relay J1, and the winding of relay J1 to terminal C. Relay K1 on picking up closes front contact 32, so that when contact 15—16 is again closed to transmit a second current impulse to row 1 of the relay chain of Fig. 3, relay L1 picks up over a circuit passing from terminal B through contact 15—16, front contact 32 of relay K1, and the winding of relay L1 to terminal C. Relay L1 in picking up closes front contact 33 which shunts relay J1 with the result that relay J1 releases, relay K1 being energized during the period of the second current impulse over a circuit passing from terminal B through the winding of relay K1 and front contact 33 of relay L1 to terminal C. Relay L1 also closes at its front contact 34 a circuit whereby the next row of relays is supplied with a current impulse. Then during the spaced interval following the second current impulse transmitted to relay row 1 of Fig. 3, relays K1 and L1 release. It is apparent that since relay K1 is not released when relay L1 picks up, relay K1 in the relay chain of Fig. 3 need not have the slow release characteristics required of that relay in the relay chain of Fig. 1. It is also apparent that the first relay row 1 of the relay chain of Fig. 3 completes its cycle of energization for each two current impulses received by that row, with the result that control relay L1 is picked up for each two successive current impulses received by that relay row to transmit a control impulse to the relay row of the next highest order. It follows that the relay chain of Fig. 3 operates in a manner similar to relay chain RC of Fig. 1, in that the control relay L for the $n$th row of relays is picked up for each $2^n$ impulses received by the relay chain, where $n$ is an exponent corresponding to the number in order of the relay row for that particular control relay.

It is to be understood, of course, that the relay chain shown in Fig. 3 may be provided also with a network of control circuits similar to that shown in Fig. 2, to provide a plurality of control circuits selectively completed in accordance with the number of impulses supplied to and received by the relay chain.

Although I have herein shown and described only two forms of railway signaling apparatus embodying my invention, it is understood that various changes and modifications may be made therein within the scope of the appended claims without departing from the spirit and scope of my invention.

Having thus described my invention, what I claim is:

1. In combination with a source of current and a contact periodically opened and closed, an impulse counting relay chain comprising a plurality of consecutive groups of three normally deenergized relays, each group of relays comprising a J and a K and an L relay, a circuit controlled by said contact for supplying said relay chain with current impulses from said source, circuit means controlled by the K and L relays of a group for setting up a circuit whereby the first of two successive current impulses supplied to that group picks up the associated J relay, circuit means controlled by said J relay when picked up for setting up a stick circuit path which includes the winding of the associated K relay, said stick circuit path initially being shunted when said contact is closed but being effective when said contact is open for energizing said J and K relays in series, circuit means controlled by said K relay when picked up for setting up a circuit whereby the second of two successive current impulses supplied to that group picks up the associated L relay to thereby interrupt said stick circuit path and release said J and K relays, and circuit means controlled by said L relay when picked up for supplying the next group of relays with a current impulse.

2. In combination, a counting relay chain comprising a plurality of groups of relays, each group of which comprises a first and a second and a control relay, means for applying a series of time spaced impulses of current to a first group of relays, a first circuit for each group comprising back contacts of the second and control relay respectively of such group for energizing the first relay of such group in response to a first impulse of current, a second circuit for each group comprising a front contact of the first and a back contact of the control relay of such group for energizing both said first and second relays of such group during the succeeding time space, a third circuit for each group comprising a front contact of the associated second relay for energizing the control relay of such group in response to a second impulse of current, a fourth circuit for each group completed through a front contact of the control relay of the group and effective to cause that control relay to be held energized by the second impulse of current, and a circuit controlled by the control relay of each group for transmitting an impulse of current to another of said groups of relays.

3. In combination, a counting relay chain comprising a plurality of groups of relays, each group of which comprises a first and a second and a control relay, means for applying a series of time spaced impulses of current to a first group of relays, a first circuit for each group comprising back contacts of the second and control relay respectively of such group for energizing the first relay of such group in response to a first impulse of current, a second circuit for each group comprising a front contact of the first and a back contact of the control relay of such group for energizing both said first and second relays of such group during the succeeding time space, a third circuit for each group comprising a front contact of the associated second relay for energizing the control relay of such group in response to a second impulse of current, means completed through a front contact of the control relay of each group for shunting the first relay of such group to hold the second relay of such group energized and to cause the release of the first relay of such group, and means controlled by the control relay of each group for transmitting an impulse of current to another of said groups of relays.

GEORGE W. BAUGHMAN.